(12) United States Patent
Wu et al.

(10) Patent No.: US 11,209,985 B2
(45) Date of Patent: Dec. 28, 2021

(54) INPUT/OUTPUT DELAY OPTIMIZATION METHOD, ELECTRONIC SYSTEM AND MEMORY DEVICE USING THE SAME

(71) Applicant: MACRONIX INTERNATIONAL CO., LTD., Hsinchu (TW)

(72) Inventors: Sheng-Lun Wu, Toufen (TW); Chun-Lien Su, Taichung (TW); Zong-Qi Zhou, Taoyuan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 309 days.

(21) Appl. No.: 16/391,439

(22) Filed: Apr. 23, 2019

(65) Prior Publication Data

US 2020/0341652 A1 Oct. 29, 2020

(51) Int. Cl.
| | |
|---|---|
| *G06F 3/06* | (2006.01) |
| *G06F 9/30* | (2018.01) |
| *G06F 1/3206* | (2019.01) |

(52) U.S. Cl.
CPC .......... *G06F 3/0611* (2013.01); *G06F 1/3206* (2013.01); *G06F 3/0658* (2013.01);
(Continued)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS

| | | | | |
|---|---|---|---|---|
| H607 | H | * | 3/1989 | Pryluck .......................... 711/104 |
| 5,500,808 | A | * | 3/1996 | Wang ....................... G06F 30/33 |
| | | | | 703/19 |

(Continued)

FOREIGN PATENT DOCUMENTS

JP 10-254920 * 9/1998

OTHER PUBLICATIONS

United States Statutory Invention Registration H607, "Addressable Delay Memory"; Pryluck, Joseph A.; Filed Jun. 27, 1986; Published Mar. 7, 1989 (Year: 1986).*

(Continued)

*Primary Examiner* — Daniel C. Chappell
(74) *Attorney, Agent, or Firm* — McClure, Qualey & Rodack, LLP (57) ABSTRACT

An input/output delay optimization method, used in an electronic system comprising a host controller and a memory device. The method comprising: switching the memory device from a first mode to a second mode a high power consumption mode of the memory device; transmitting one or more first read commands to the memory device, wherein the one or more first read commands are transmitted according to different output delay values; determining an optimized output delay value according to the response status of memory device for the one or more first read commands; transmitting one or more second read commands to the memory device, wherein the one or more second read commands are transmitted according to the optimized output delay value; receiving a known data from the memory device according to different input delay values; and determining an optimized input delay value according to the correctness of the received known data.

22 Claims, 4 Drawing Sheets

(52) U.S. Cl.
CPC .......... *G06F 3/0659* (2013.01); *G06F 3/0688* (2013.01); *G06F 9/30101* (2013.01)

(58) Field of Classification Search
CPC .......... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 6,111,796 | A * | 8/2000 | Chang | G11C 7/06 365/190 |
| 6,253,333 | B1 * | 6/2001 | Bogumil | G01R 31/3016 713/503 |
| 6,608,795 | B2 * | 8/2003 | Arimoto | G11C 7/1072 365/230.03 |
| 7,522,441 | B2 * | 4/2009 | Kumagai | G09G 3/2096 365/230.03 |
| 7,561,478 | B2 * | 7/2009 | Kumagai | G09G 3/3611 365/189.09 |
| 7,564,734 | B2 * | 7/2009 | Kumagai | G09G 5/363 365/189.08 |
| 7,567,479 | B2 * | 7/2009 | Kumagai | G09G 5/363 365/189.08 |
| 8,144,533 | B2 * | 3/2012 | Cano | G11C 7/08 365/194 |
| 9,053,768 | B2 * | 6/2015 | Shu | G11C 11/419 |
| 9,077,487 | B2 * | 7/2015 | Seely | H04L 27/0008 |
| 9,083,360 | B2 * | 7/2015 | Lee | H03L 7/095 |
| 9,159,382 | B2 * | 10/2015 | Kishimoto | G11C 7/1078 |
| 9,203,449 | B2 * | 12/2015 | Matsubara | H04B 1/0475 |
| 9,313,016 | B2 * | 4/2016 | Morita | H04L 7/0337 |
| 9,319,788 | B2 * | 4/2016 | Banba | H04R 3/005 |
| 9,355,744 | B2 * | 5/2016 | Chang | G11C 29/028 |
| 9,363,618 | B2 * | 6/2016 | Ma | H04R 1/403 |
| 9,571,110 | B2 * | 2/2017 | Maeda | H03L 7/095 |
| 9,594,396 | B2 * | 3/2017 | Turner | G06F 1/12 |
| 9,680,709 | B2 * | 6/2017 | Meilhac | H04L 27/261 |
| 10,069,741 | B2 * | 9/2018 | Mendez | H04L 47/25 |
| 10,283,181 | B2 * | 5/2019 | Toops | G11C 11/2293 |
| 2007/0002671 | A1 * | 1/2007 | Kumagai | G11C 5/025 365/230.06 |
| 2009/0016128 | A1 * | 1/2009 | Hirano | G11C 7/1018 365/194 |
| 2012/0242385 | A1 * | 9/2012 | Tokuhiro | G06F 13/1689 327/158 |
| 2020/0241487 | A1 * | 7/2020 | Zhao | G05B 13/0285 |

OTHER PUBLICATIONS

V. T. Huynh, A. Arogbonlo, H. Trinh and A. M. T. Oo, "Design of Observers for Positive Systems With Delayed Input and Output Information," in IEEE Transactions on Circuits and Systems II: Express Briefs, vol. 67, No. 1, pp. 107-111, Jan. 2020, doi: 10.1109/TCSII.2019.2900731. (Year: 2020).*

M. Xia, A. Rahnama, S. Wang and P. J. Antsaklis, "Performance optimization based on passivation of systems with applications to systems with input/output delay," 2016 American Control Conference (ACC), 2016, pp. 973-978, doi: 10.1109/ACC.2016.7525041. (Year: 2016).*

Hai-Hong Wang, "Optimal tracking for discrete-time systems with input delays," 2008 Chinese Control and Decision Conference, 2008, pp. 4033-4037, doi: 10.1109/CCDC.2008.4598089. (Year: 2008).*

Machine translation of JP 10-254924; patents.google.com; retrieved from https://patents.google.com/patent/JPH10254920A/en?oq=JP-10254920 on Sep. 9, 2021 (Year: 1998).*

* cited by examiner

INPUT/OUTPUT DELAY OPTIMIZATION METHOD, ELECTRONIC SYSTEM AND MEMORY DEVICE USING THE SAME

BACKGROUND OF THE INVENTION

Field of the Invention

The invention relates to an input/output delay optimization method, and an electronic system and a memory device using the same.

Description of the Related Art

In an electronic system, a host controller and a memory device are generally included. The host controller is, for example, a central processing unit (CPU), and the memory device is, for example, a random access memory (RAM). The host controller may be configured to send commands to the memory device for writing data into the memory device or reading data from the memory device. The operations may be implemented by transmitting signals to the memory device or receiving signals from the memory device, by the host controller. The setup time and hold time of those input signals and output signals delivering between the host controller and the memory device may affect the validity of the signals. In some specific operations, for example, a high power consumption operation, the setup time and the hold time of the input/output signals may be shifted, and data may be written or read incorrectly. In order to improve reliability, there is a need of optimizing the setup time and hold time for the input/output signals.

SUMMARY OF THE INVENTION

The purpose of the present invention is to provide an input/output delay optimization method, and a system and a memory device using the method.

An aspect of the present invention discloses an input/output delay optimization method, used in an electronic system. The electronic system comprises a host controller and a memory device. The method comprising: switching, by the host controller, the memory device from a first mode to a second mode; transmitting, by the host controller, one or more first read commands to the memory device, wherein the one or more first read commands are transmitted according to different output delay values; determining, by the host controller, an optimized output delay value according to the response status of memory device for the one or more first read commands; transmitting, by the host controller, one or more second read commands to the memory device, wherein the one or more second read commands are transmitted according to the optimized output delay value; receiving, by the host controller, a known data from the memory device according to different input delay values; and determining, by the host controller, an optimized input delay value according to the correctness of the received known data.

Another aspect of the present invention discloses an input/output delay optimized electronic system, comprising: a memory device and a host controller. The host controller is coupled to the memory device. The host controller configured to perform following operations: switching the meniry device from a first mode to a second mode; transmitting one or more first read commands to the memory device, wherein the one or more first read commands are transmitted according to different output delay values; determining an optimized output delay value according to the response status of memory device for the one or more first read commands; transmitting one or more second read commands to the memory device, wherein the one or more second read commands are transmitted according to the optimized output delay value; receiving a known data from the memory device according to different input delay values; and determining an optimized input delay value according to the correctness of the received known data.

Yet another embodiment of the present invention discloses a memory device, comprising a memory array and a memory controller. The memory controller is configured to be coupled to the memory array. The memory controller configured to perform following operations: switching from a first mode to a second mode; receiving one or more first read commands from the host controller, wherein the one or more first read commands are transmitted according to different output delay values; identifying the one or more first read commands, and responding for the first read command(s) which is/are identified; receiving one or more second read commands from the host controller, wherein the one or more second read commands are transmitted according to an optimized output delay value; and transmitting a known data to the host controller in response to each of the second read commands.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
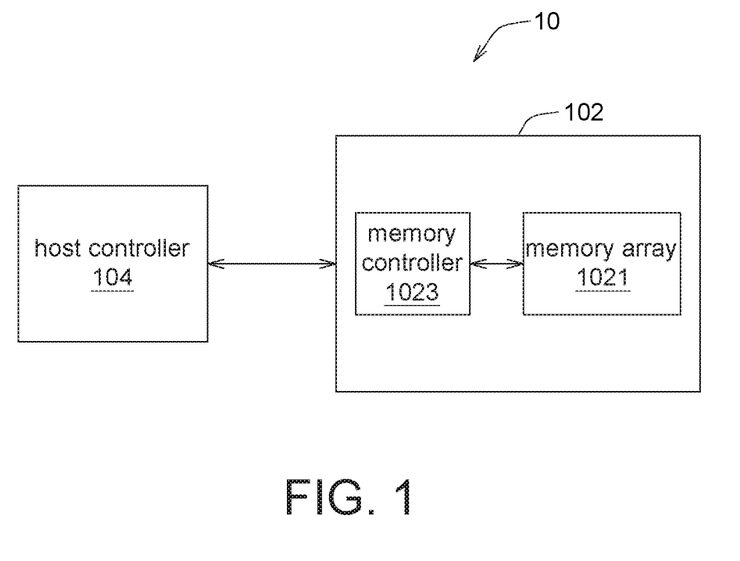
FIG. 1 shows a block diagram of an electronic system according to an embodiment of the present invention.

Referring to FIG. 1, FIG. 1 shows a block diagram of an electronic system according to an embodiment of the present invention. The electronic system 10 includes a memory device 102 and a host controller 104. The memory device 102 may include a memory array 1021, a memory controller 1023 and other circuits (not shown). The memory array 1021 may be, for example, a NAND flash memory array or a NOR flash memory array. The memory array may include a number of memory banks. The memory controller 1023 is coupled to the memory array 1021, and may include software, hardware or firmware for operating the memory array 1021.

The host controller 104 may be a central processing unit (CPU). The host controller 104 may be coupled to the memory device 102 via a bus. By the bus, the host controller may send various commands to the memory device 102 to cause the memory device 102 to perform corresponding operations.

Figure 2:
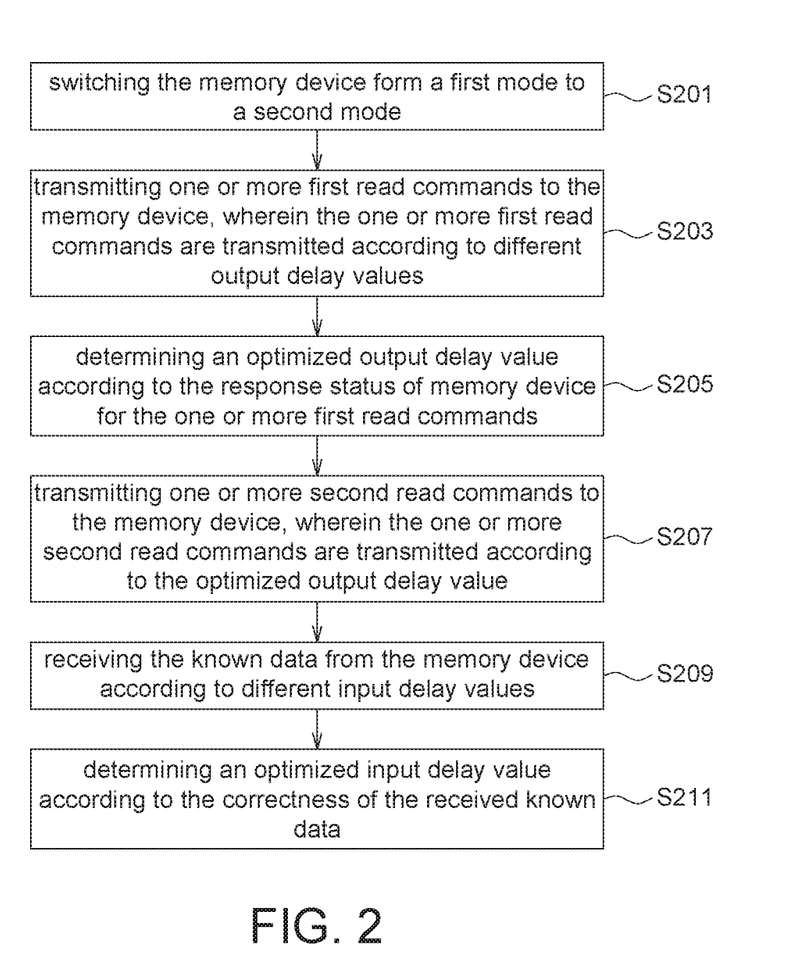
FIG. 2 shows an input/output delay optimization method according to an embodiment of the present invention.

Referring to FIG. 2, FIG. 2 shows an input/output delay optimization method according to an embodiment of the present invention. The method shown in FIG. 2 may be applied to the electronic system 10. That is, the memory device 102 and the host controller 104 may both apply said method.

In step S201, the host controller 104 switches the memory device 102 from a first mode to a second mode. In an embodiment, the first mode is an ordinary mode, and the second mode is a high power consumption mode such as read-while-write (RWW) mode. The host controller 104 may send a write command to the memory device to cause the memory device 102 to perform a write operation, e.g., to cause the memory controller 1023 to write a specific area of the memory array 1021. The subsequent steps after this step (step S201) are all performed during the execution of the write operation performed by the memory device 102. In another embodiment, the host controller 104 sends an enabling command to the memory device 102, wherein the enabling command is an additional command which may be particularly defined for input/output delay optimization and different from conventional commands. The memory controller 1023 of the memory device 102 may turn on one or more circuits (not shown) of the memory device 102 to increase power consumption, in response to the enabling command. In yet another embodiment, the host controller 104 sends a register setting command to the memory device 102. The memory controller 1023 may set a specific register, e.g., a one bit register, in response to the register setting command. While the specific register is set, the memory controller 1023 may turn on one or more circuits of the memory device 102 to increase the power consumption. In an embodiment, the memory device 102 may include one or more high voltage (HV) circuits which are configured as charge pumps for changing or adjusting (e.g., pumping up or pumping down) the threshold voltage of memory cell(s) of the memory array 1021 before being programmed or erased. In this embodiment, the memory controller 1023 may turn on the HV circuits to increase the power consumption, for example, to simulate a read-while-write mode. Although the embodiments are implemented by different approaches, the memory device 102 can be configured in a high power consumption state (i.e., either under a true RWW mode or a simulated RWW mode). When the memory device 102 is in the high power consumption state, the host controller 104 may adjust the output delay value of output signals and the input delay value for receiving input signals to improve the correctness of signal delivering. In other words, the optimized output delay value and optimized input delay value obtained in the high power consumption mode of the memory device 102 may also be usable when the memory device 102 is not in the high power consumption mode.

In step S203, the host controller 104 transmits one or more first read commands to the memory device 102, wherein the one or more first read commands are transmitted according to different output delay values.

In step S205, the host controller 104 determines an optimized output delay value according to the response status of memory device 102 for the one or more first read commands.

Figure 3:
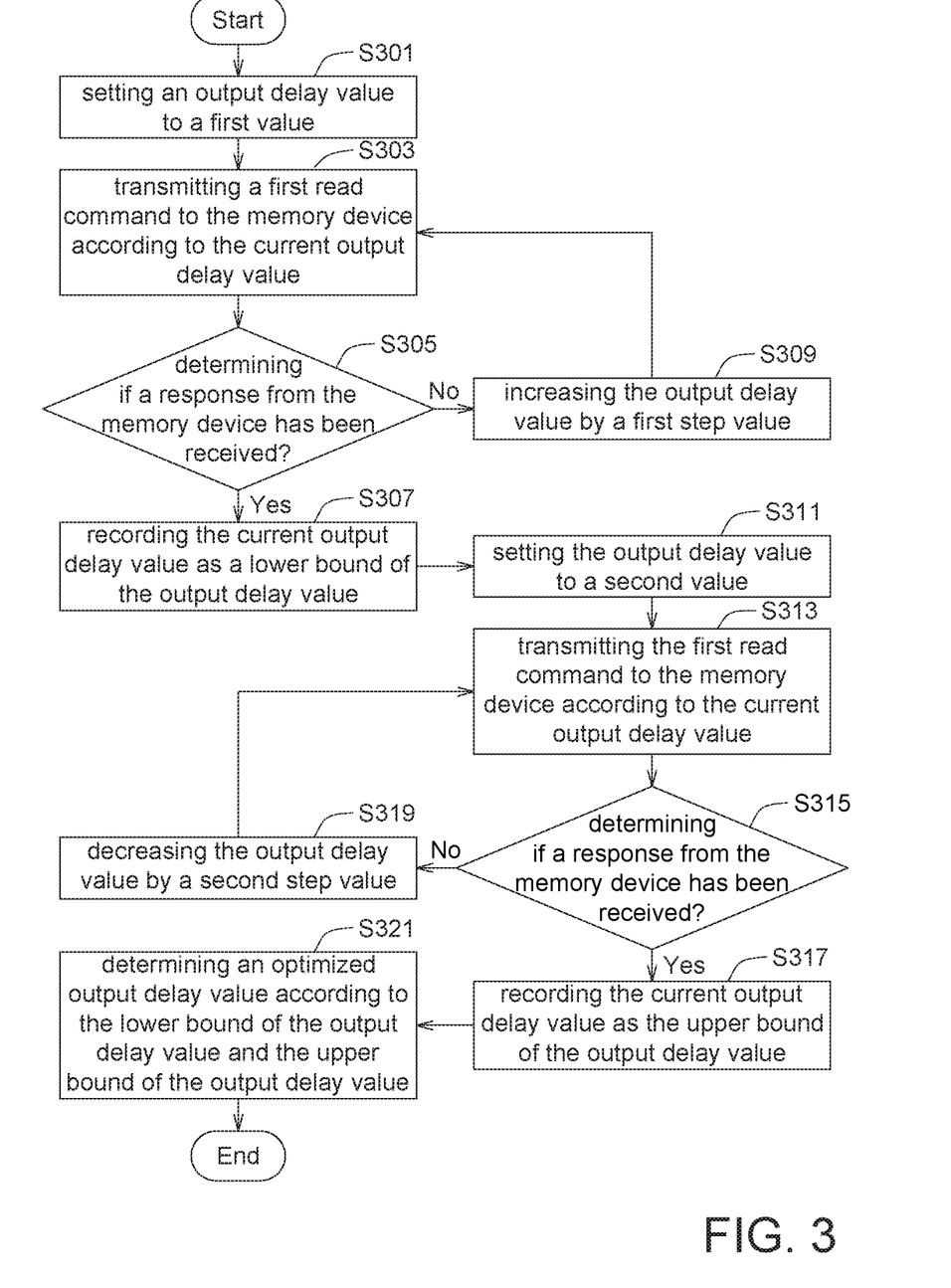
FIG. 3 shows an example of performing output delay optimization according to an embodiment of the present invention.

For further understanding step S203 and step S205, please also refer to FIG. 3. FIG. 3 shows an example of performing output delay optimization according to an embodiment of the present invention. In the example shown in FIG. 3, the host controller 104 may include field programmable gate array (FPGA) for implementing the steps shown in the figure.

In step S301, the host controller 104 sets an output delay value to a first value, wherein the first value is, for example, 0.

In step S303, the host controller 104 transmits a first read command to the memory device 102 according to the current output delay value. After the memory controller 1023 of the memory device 102 received the first read command, the memory controller 1023 may analyze/identify the first read command. If the first read command can be analyzed/identified, the memory device 102 may respond the host controller 104 to notify the host controller 104 that the first read command can be analyzed/identified.

In step S305, the host controller 104 determines if a response from the memory device 102 has been received. If yes, step S307 may be performed; if no, step S309 may be performed.

In step S307, the host controller 104 records the current output delay value as a lower bound of the output delay value.

In step S309, the host controller 104 increases the output delay value by a first step value, wherein the first step value is, for example, 1.

In steps S301-S309, the output delay value is gradually increased from the first value until an output delay value that the first read command transmitted according to the output delay value can be identified by the memory device 102 is obtained, and the obtained output delay value is set as the lower bound of the output delay value. After the lower bound of the output delay is obtained, the subsequent steps are to obtain an upper bound of the output delay value.

In step S311, the host controller 104 sets the output delay value to a second value, wherein the second value is, for example, 360.

In step S313, the host controller 104 transmits the first read command to the memory device 102 according to the current output delay value. After the memory controller 1023 of the memory device 102 received the first read command, the memory controller 1023 may analyze/identify the first read command. If the first read command can be analyzed/identified, the memory device 102 may respond the host controller 104 to notify the host controller 104 that the first read command can be analyzed/identified.

In step S315, the host controller 104 determines if a response from the memory device 102 has been received. If yes, step S317 may be performed; if no, step S319 may be performed.

In step S317, the host controller 104 records the current output delay value as the upper bound of the output delay value.

In step S319, the host controller 104 decrease the output delay value by a second step value, wherein the second step value is, for example, 1.

In steps S311-S319, the output delay value is gradually decreased from the second value until an output delay value that the first read command transmitted according to the output delay value can be identified by the memory device 102 is obtained, and the obtained output delay value is set as the upper bound of the output delay value. By the above steps, the host controller can obtain a range of the output delay value, that is, a range between the lower bound of the output delay value and the upper bound of the output delay value, that the read command transmitted according to the output delay value within the range can be identified by the memory device 102.

In step S321, the host controller 104 determines an optimized output delay value according to the lower bound of the output delay value and the upper bound of the output delay value. In an embodiment, the host controller 104 calculates the average of the lower bound of the output delay value and the upper bound of the output delay value as the optimized output delay value. In another embodiment, the host controller 104 calculates the optimized output delay value by weighting the lower bound of the output delay value and the upper bound of the output delay value. In yet another embodiment, the host controller 104 selects the optimized output delay value randomly from the range between the lower bound of the output delay value and the upper bound of the output delay value.

In this embodiment, the output delay value, the first step value, the second step value and the optimized output delay value have a unit of 10 ps. For example, while the output delay value is 360, it means that the actual output delay time is 360*10 ps=3600 ps. Noted that, the unit of the output delay value, the first step value, the second step value and the optimized output delay value may be configured according to the system requirement. In some embodiments, the unit of the output delay value, the first step value, the second step value and the optimized output delay value may be select from 10 ps to 1000 ps, for example, 20 ps, 110 ps, 300 ps, 470 ps, 720 ps, 960 ps and so on.

Next, continue to step S207 in FIG. 2. In step S207, the host controller 104 transmits one or more second read commands to the memory device 102, wherein the one or more second read commands are transmitted according to the optimized output delay value. Since the second read commands are transmitted according to the optimized output delay value, without influence of other factors, the memory device 102 may be able to identify the second read commands. In response to each of the second read command, the memory controller 1023 of the memory device 102 transmits a known data to the host controller 104. The known data refers to data which is known by the host controller 104. In an embodiment, the known data may be written into a predetermined area of the memory array 1021 by the host controller 104 before the electronic system 10 performs the method. In another embodiment, the known data may be pre-programmed into a pre-defined data register of the memory device 102. In yet another embodiment, the known data may be pre-programmed into hard code of the memory device 102.

In step S209, the host controller 104 receives the known data from the memory device 102 according to different input delay values.

In step S211, the host controller 104 determines an optimized input delay value according to the correctness of the received known data.

Figure 4:
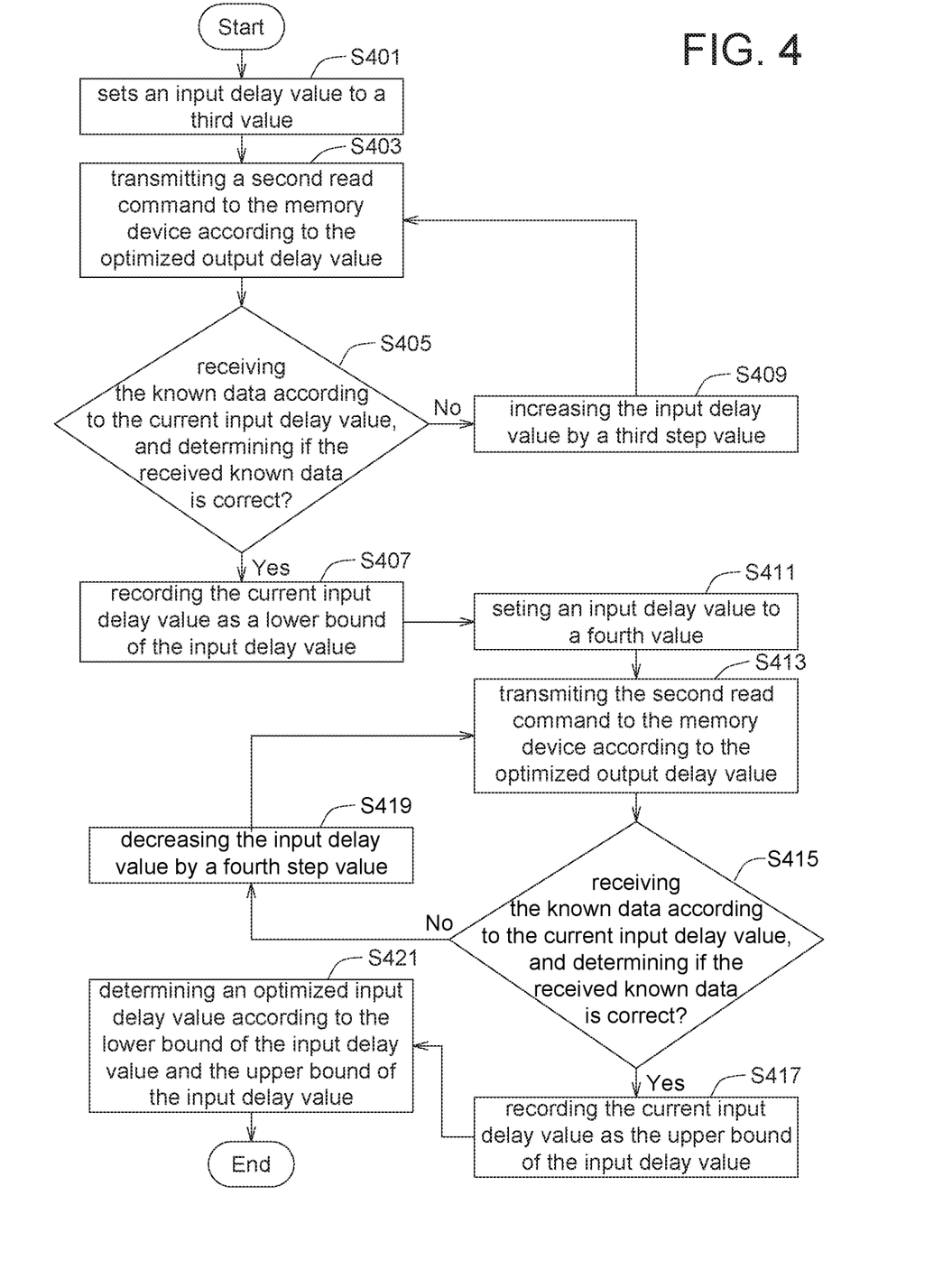
FIG. 4 shows an example of performing input delay optimization according to an embodiment of the present invention.

For further understanding steps S207-S211, please also refer to FIG. 4. FIG. 4 shows an example of performing input delay optimization according to an embodiment of the present invention. In the example shown in FIG. 4, the host controller 104 may include field programmable gate array (FPGA) for implementing the steps shown in the figure.

In step S401, the host controller 104 sets an input delay value to a third value, wherein the third value is, for example, 0.

In step S403, the host controller 104 transmits a second read command to the memory device 102 according to the optimized output delay value. In response to the second read command, the memory controller 1023 of the memory device 102 transmits a known data to the host controller 104.

In step S405, the host controller 104 receives the known data according to the current input delay value, and determines if the received known data is correct. If yes, step S407 may be performed; if no, step S409 may be performed.

In step S407, the host controller 104 records the current input delay value as a lower bound of the input delay value.

In step S409, the host controller 104 increases the input delay value by a third step value, wherein the third step value is, for example, 1.

In steps S401~S409, the input delay value is gradually increased from the third value until an input delay value, that the known data received according to the input delay value is correct, is obtained, and the obtained input delay value is set as the lower bound of the input delay value. After the lower bound of the input delay is obtained, the subsequent steps are to obtain an upper bound of the input delay value.

In step S411, the host controller 104 sets an input delay value to a fourth value, wherein the fourth value is, for example, 31.

In step S413, the host controller 104 transmits the second read command to the memory device 102 according to the optimized output delay value. In response to the second read command, the memory controller 1023 of the memory device 102 transmits the known data to the host controller 104.

In step S415, the host controller 104 receives the known data according to the current input delay value, and determines if the received known data is correct. If yes, step S417 may be performed; if no, step S419 may be performed.

In step S417, the host controller 104 records the current input delay value as the upper bound of the input delay value.

In step S419, the host controller 104 decreases the input delay value by a fourth step value, wherein the fourth step value is, for example, 1.

In steps S411~S419, the input delay value is gradually decreased from the fourth value until an input delay value, that the known data received according to the input delay value is correct, is obtained, and the obtained input delay value is set as the upper bound of the input delay value. By the above steps, the host controller 104 may obtain a range of input delay value, that is, a range between the lower bound of the input delay value and the upper bound of the input delay value, which data received according to the input delay value within the range, is correct.

In step S421, the host controller 104 determines an optimized input delay value according to the lower bound of the input delay value and the upper bound of the input delay value. In an embodiment, the host controller 104 calculates the average of the lower bound of the input delay value and the upper bound of the input delay value as the optimized input delay value. In another embodiment, the host controller 104 calculates the optimized input delay value by weighting the lower bound of the input delay value and the upper bound of the input delay value. In yet another embodiment, the host controller 104 selects the optimized input delay value randomly from the range between the lower bound of the input delay value and the upper bound of the input delay value.

In this embodiment, the input delay value, the third step value, the fourth step value and the optimized input delay value have a unit of 78 ps. For example, while the input delay value is 31, it means that the actual input delay time is 31*78 ps=2418 ps. Noted that, the unit of the input delay value, the third step value, the fourth step value and the optimized input delay value may be configured according to the system requirement. In some embodiments, the unit of the input delay value, the third step value, the fourth step value and the optimized input delay value may be select from 10 ps to 1000 ps, for example, 60 ps, 170 ps, 350 ps, 500 ps, 700 ps, 910 ps and so on.

Noted that, from the perspective of the memory device 102, whenever the memory device 102 receives the first read command or the second read command, the memory controller 1023 may intend to identify the received first command or the received second command. In the case of the first commands, it may not guarantee that the memory controller 1023 is able to identify all the received first read commands since the output delay is still not optimized. On the other hand, in the case of the second read commands, the memory controller 1023 is able to identify all the second read commands if there is none of any other factors since the output delay has been optimized.

Noted that, the specific area of the memory array, the predetermined area of the memory array, the specific register and the pre-defined data register may be configured for the input/output delay optimization. That is, the normal operation of the memory device may not be affected.

Although the above embodiments take a scenario of switching the memory device from the ordinary mode to the high power consumption mode as an example, said method may be apply to any scenario if needed. For example, said method may be performed when the memory device is switched from low frequency read mode (i.e., the first mode) to a high frequency read mode (i.e., the second mode), or when the memory device is switched from the high power consumption mode to the ordinary mode. That is, the combination of the first mode and the second mode is not limited by the above embodiments.

The above method may be performed automatically during booting, or may be performed in response to operations of a user during runtime of the electronic system. The optimized output delay value and optimized input delay value is usable in a normal mode or non-high power consumption mode. Furthermore, while the memory device is switched to a high power consumption mode from a non-high power consumption mode, the host controller may keep using the optimized input/output delay value, and the correctness of data reading may not be affected.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An input/output delay optimization method, used in an electronic system, the electronic system comprising a host controller and a memory device, the method comprising: switching, by the host controller, the memory device from a first mode to a second mode; transmitting, by the host controller, one or more first read commands to the memory device, wherein the one or more first read commands are transmitted by the host controller according to different output delay values; determining, by the host controller,
an optimized output delay value according to a response status of the memory device for the one or more first read commands transmitted by the host controller; transmitting, by the host controller, one or more second read commands to the memory device to cause the memory device to transmit a known data to the host controller in response to the one or more second read commands, wherein the one or more second read commands are transmitted by the host controller according to the optimized output delay value after the step of determining, by the host controller, the optimized output delay value according to the response status of the memory device for the one or more first read commands; receiving, by the host controller, the known data transmitted from the memory device according to different input delay values; and
determining, by the host controller, an optimized input delay value after receiving the known data transmitted from the memory device and after determining the correctness of the received known data.

2. The method according to claim 1, wherein the known data is pre-programmed into a pre-defined data register of the memory device; is pre-programmed into a predetermined area of a memory array that is part of the memory device; or is hard-coded into the memory device.

3. The method according to claim 1, wherein in the step of determining, by the host controller, an optimized output delay value according to the response status of memory device for the one or more first read commands, the host controller determines an upper bound of the output delay value and a lower bound of the output delay value, and determines the optimized output delay value according to the upper bound of the output delay value and the lower bound of the output delay value.

4. The method according to claim 1, wherein in the step of determining, by the host controller, an optimized input delay value according to the correctness of the received known data, the host controller determines an upper bound of the input delay value and a lower bound of the input delay value, and determines the optimized input delay value according to the upper bound of the input delay value and the lower bound of the input delay value.

5. The method according to claim 1, wherein the second mode is a high power consumption mode.

6. The method according to claim 5, wherein in the step of switching, by the host controller, the memory device from a first mode to a second mode, the host controller transmits a write command to the memory device to cause the memory device to perform a write operation on a specific area of a memory array of the memory device, and the subsequent steps following the step of switching, by the host controller, the memory device from a first mode to a second mode are performed during the write operation of the memory device.

7. The method according to claim 5, in the step of switching, by the host controller, the memory device from a first mode to a second mode, the host controller transmits an enabling command to the memory device to cause the memory device to turn on one or more circuits of the memory device.

8. The method according to claim 5, wherein in the step of switching, by the host controller, the memory device from a first mode to a second mode, the host controller transmits a register setting command to the memory device to cause the memory device to set a specific register, and the memory device turns on one or more circuits while the specific register of the memory device is set.

9. An input/output delay optimized electronic system, comprising: a memory device; and a host controller, coupled to the memory device, the host controller configured to perform following operations:
switching, by the host controller, the memory device from a first mode to a second mode; transmitting, by the host controller, one or more first read commands to the memory device, wherein the one or more first read commands are transmitted by the host controller according to different output delay values; determining, by the host controller, an optimized output delay value according to a response status of the memory device for the one or more first read commands transmitted by the host controller; transmitting, by the host controller, one or more second read commands to the memory device to cause the memory device to transmit a known data to the host controller in response to the one or more second read commands, wherein the one or more second read commands are transmitted by the host controller according to the optimized output delay value after the step of determining, by the host controller, the optimized output delay value according to the response status of the memory device for the one or more first read commands; receiving, by the host controller, the known data transmitted from the memory device according to different input delay values; and determining, by the host controller, an optimized input de lay value after receiving the known data transmitted from the memory device and after determining the correctness of the received known data.

10. The method according to claim 9, wherein the known data is pre-programmed into a pre-defined data register of the memory device; is pre-programmed into a predetermined area of a memory array that is part of the memory device; or is hard-coded into the memory device.

11. The input/output delay optimized electronic system according to claim 9,
wherein in the operation of determining an optimized output delay value according to the response status of memory device for the one or more first read commands, the host controller determines an upper bound of the output delay value and a lower bound of the output delay value, and determines the optimized output delay value according to the upper bound of the output delay value and the lower bound of the output delay value.

12. The input/output delay optimized electronic system according to claim 9,
wherein in the operation of determining, by the host controller, an optimized input delay value according to the correctness of the received known data, the host controller determines an upper bound of the input delay value and a lower bound of the input delay value, and determines the optimized input delay value according to the upper bound of the input delay value and the lower bound of the input delay value.

13. The input/output delay optimized electronic system according to claim 9, wherein the second mode is a high power consumption mode.

14. The input/output delay optimized electronic system according to claim 13,
wherein in the operation of switching the memory device from a first mode to a second mode,
the host controller transmits a write command to the memory device to cause the memory device to perform a write operation on a specific area of a memory array of the memory device, and the subsequent steps following the operation of enabling the high power consumption mode of the memory device are performed during the write operation of the memory device.

15. The input/output delay optimized electronic system according to claim 13,
wherein in the operation of switching the memory device from a first mode to a second mode,
the host controller transmits an enabling command to the memory device to cause the memory device to turn on one or more circuits of the memory device.

16. The input/output delay optimized electronic system according to claim 13, wherein in the operation of switching, by the host controller, the memory device from a first mode to a second mode, the host controller transmits a register setting command to the memory device to cause the memory device to seta specific register, and the memory device turns on one or more circuits while the specific register of the memory device is set.

17. A memory device, configured to be coupled to a host controller, the memory device comprising: a memory array; and a memory controller, coupled to the memory array, the memory controller configured to perform following operations: switching the memory device from a first mode to a second mode; receiving one or more first read commands from the host controller, wherein the one or more first read commands are transmitted according to different output delay values; identifying the one or more first read commands, and responding for the one or more first read commands which are identified; receiving one or more second read commands from the host controller, wherein the one or more second read commands are transmitted to the memory controller according to an optimized output delay value after the output delay value is determined by the host controller; and transmitting, by the memory controller, a known data to the host controller in response to each of the one or more second read commands from the host controller to cause the host controller to determine an optimized input delay value after receiving the known data and after determining the correctness of the received known data.

18. The method according to claim 17, wherein the known data is pre-programmed into a pre-defined data register of the memory device;
is pre-programmed into a predetermined area of a memory array that is part of the memory device; or is hard-coded into the memory device.

19. The memory device according to claim 17, wherein the second mode is a high power consumption mode.

20. The memory device according to claim 19, wherein in the operation of switching from a first mode to a second mode, the memory controller is configured to perform a write operation on a specific area of the memory array in response to a write command from the host controller, and the subsequent operations following the operation of enabling a high power consumption mode are performed during the write operation.

21. The memory device according to claim 19, wherein in the operation of switching the memory device from a first mode to a second mode, the memory controller is configured to turn on one or more circuits of the memory device in response to an enabling command from the host controller.

22. The memory device according to claim 19, wherein in the operation of switching the memory device from a first mode to a second mode, the memory controller is configured to set a specific register of the memory device in response to a register setting command, while the specific register is set, the memory device turns on one or more circuits of the memory device.

* * * * *